United States Patent
Muhr et al.

(10) Patent No.: US 7,173,543 B2
(45) Date of Patent: Feb. 6, 2007

(54) MEASURING TRANSDUCER

(75) Inventors: Andreas Muhr, Linkenheim-Hochstetten (DE); Peter Schmith, Hagenbach (DE)

(73) Assignee: Siemens Aktiengesellschaft, Munich (DE)

( * ) Notice: Subject to any disclaimer, the term of this patent is extended or adjusted under 35 U.S.C. 154(b) by 1024 days.

(21) Appl. No.: 10/015,643

(22) Filed: Dec. 17, 2001

(65) Prior Publication Data

US 2002/0070877 A1 Jun. 13, 2002

Related U.S. Application Data

(63) Continuation of application No. PCT/DE00/01942, filed on Jun. 13, 2000.

(30) Foreign Application Priority Data

Jun. 15, 1999 (DE) ................. 199 27 282

(51) Int. Cl.
*G08C 25/02* (2006.01)
(52) U.S. Cl. ............ 340/870.07; 700/287
(58) Field of Classification Search .......... 340/870.07, 340/870.18; 700/287, 291, 286, 292; 73/1.38
See application file for complete search history.

(56) References Cited

U.S. PATENT DOCUMENTS

| | | | |
|---|---|---|---|
| 4,218,746 A | 8/1980 | Koshiishi | |
| 4,328,494 A | 5/1982 | Goodall | |
| 5,574,211 A | 11/1996 | Shimada et al. | |
| 5,963,734 A | 10/1999 | Ackerman et al. | |
| 6,529,780 B1 * | 3/2003 | Soergel et al. | ................. 700/10 |

FOREIGN PATENT DOCUMENTS

| | | |
|---|---|---|
| DE | 24 37 438 B | 2/1976 |
| DE | 28 24 190 A1 | 12/1979 |
| DE | 196 06 826 A1 | 8/1997 |
| DE | 197 15 047 A1 | 10/1998 |
| DE | 197 19 633 A1 | 11/1998 |

OTHER PUBLICATIONS

MLX90308 -Programmierbares Sensor-Interface, in Elektor, Nov. 1998, pp. 72-75.

* cited by examiner

*Primary Examiner*—Wendy R. Garber
*Assistant Examiner*—Hung Q Dang
(74) *Attorney, Agent, or Firm*—Sughrue Mion, PLLC

(57) ABSTRACT

A measuring transducer with a sensor for converting a detected measured value into a sensor signal. The sensor signal is processed in a signal processing device to form a measuring signal that is transmitted to a central location via a data interface. The data interface is also used as a conduit for signals to parameterize the measuring transducer. The measuring transducer includes a device that provides a simulated measuring signal that can be transmitted to the central location on request via the data interface instead of the detected measured value. Further, a function can be performed on the simulated measuring signal before it is transmitted or a sequence of simulated measuring values can be transmitted corresponding to particular operating conditions.

5 Claims, 2 Drawing Sheets

MEASURING TRANSDUCER

This is a Continuation of International Application PCT/DE00/01942, with an international filing date of Jun. 13, 2000, which was published under PCT Article 21(2) in German, and the disclosure of which is incorporated into this application by reference.

FIELD OF THE INVENTION

The present invention generally relates to a measuring transducer for sensing, digitizing and transmitting a detected parameter value in, for example, a technical plant. In particular, the present invention relates to a measuring transducer that can provide a simulated detected parameter that closely resembles a value detected under normal operating conditions, even when no regular detected values can be detected.

BACKGROUND OF THE INVENTION

A typical measuring transducer without the disclosed improvements of the present invention is illustrated in SIEMENS Catalogue MP 17, 1999 and is referred to as SITRANS P DS. The measuring transducer disclosed in this catalogue has a pressure sensor with a sensor signal that is amplified, digitized and subsequently evaluated in a microcontroller and adjusted with respect to linearity and temperature behavior. The measuring signal thus processed is supplied via a data interface, e.g., PROFIBUS or HART, to the communications system of a technical plant in which the measuring transducer is installed. The measuring transducer also can be parameterized via the data interface, for instance from a plant control room, etc.

In larger technical plants, thousands of measuring transducers may be installed, each detecting a single parameter value, such as pressure, temperature, etc., that must be recorded and processed accurately to ensure proper operation of the plant. To start up or maintain such a plant, every connection path, for instance from the plant control room to the many individual measuring points, must be checked. Furthermore, the functionality of all the partial areas as well as of the entire system must be checked when the system is initially started. In the aggregate, the length of communication line needed comprises several hundred meters between each of the measuring points and the plant control room. This results in several kilometers of line length, each of which must be tested and maintained often (initially, at plant startup, as well as periodically) to ensure proper parameterization of the system operation within the plant.

However, since there are typically no actual, or "real", measured values available during this testing or maintenance, conventionally, parameter values have been digitally simulated within the control system of the plant. To accommodate this simulation much storage space and program runtime had to be kept available in the individual components of the control system. Additionally, the effects of the long distances between the measuring points and the plant control room were excluded from the simulation and had to be taken into account by other means.

To initiate a measuring transducer without real measured values being available, one conventional solution utilizes a dummy sensor, for instance in the form of a resistor network connected to the electronics of the measuring transducer. The dummy sensor can be adjusted to provide different resistance values and, thus, can supply a simulated signal to the plant control room that can be used for test purposes. This technique, however, involves substantial mechanical complexity and requires qualified personnel at each of the individual measuring points.

OBJECTS OF THE INVENTION

One object of the invention is to provide a measuring transducer that simplifies startup and maintenance of technical plants containing measuring transducers.

Another object of the invention is to provide a measuring transducer that supplies its own simulated measuring value, or a real measuring value, to the plant communication system while being controlled remotely from the plant control room.

Yet another object of the invention is to provide a measuring transducer that supplies a simulated measuring value to the plant communication system while taking into account various other parameters that can effect a real measured value.

SUMMARY OF THE INVENTION

According to the invention, the objects mentioned above as well as others are achieved by providing a measuring transducer having a device for predefining a simulated measuring signal. The measuring transducer is part of the technical plant and communicates with other parts of the plant, such as other transducers, controllers and, a master computer that controls the entire plant, via a communication system of the plant. In addition, a portable computer, for example a programmer, can be connected to the communication system in order to communicate with parts of the plant. For example, control signals can be sent to the measuring transducers directly from the portable computer while leaving other control functions of the plant up to the master controller. Further, the simulated measuring signal or the real measured signal can be transmitted on request via a data interface linking the measuring transducer to various elements of the plant via the plant communication system.

Simulating the measuring signal in the measuring transducer offers the advantage that the wiring from the plant control room to the individual measuring transducers can be tested to, among other things, ensure that the wiring from the transducers to the control room are intact. In addition, by activating the simulation from the plant control room, measuring signals can be received from the plant control room by way of substitution and further processed without measured values being present at the measuring points. This makes it possible to simulate actual individual process sequences and process states in the "cold" state of the plant, i.e., without detecting actual measured values at the transducers. Furthermore, if certain processes, or portions, of the plant fail during operation, measuring signals can be simulated for a brief period by activating the simulation process, for instance using the most recent valid measured value. Running simulated test processes in this manner can prevent failure of the entire plant from occurring as a result of various isolated failures corrupting otherwise operable processes.

According to the invention, it is also possible to test essential signal processing elements of the measuring transducer. For example, according to one embodiment, the simulated measuring signal passes through at least a portion of the signal processing device of the measuring transducer. This may be accomplished, for instance, by simulating an amplified and subsequently digitized sensor signal and passing the simulated value through the same path in the signal processing device and onward to the data interface as the sensor signal itself. This makes it possible to check, for example, the correction of the sensor signal in the signal processing device with respect to linearity and temperature behavior.

According to a further embodiment, the simulated measuring signal can be transmitted from the measuring transducer, on request via the data interface, to the plant communication system. A measuring transducer according to this embodiment preferably comprises a controllable switchover device which can be switched via the data interface to either a position that connects the actual measuring signal or the simulated measuring signal to the data interface.

The device for predefining the simulated measuring signal can comprise a single simulated measuring value memory in which a simulated measuring value is stored. Preferably, however, there is provided at least one additional simulated measuring value memory storing an additional simulated measuring value, and one of the simulated measuring value memories can be selected via the data interface to transmit the simulated measuring value stored therein.

To be able to generate not only a simulated measuring value but also a time-dependent function as a simulated measuring signal, at least one function generator can be switched via the data interface between the data interface and the selected simulated measuring value memory. The function generator produces the simulated measuring signal as a function of the corresponding simulated measuring value over time.

In accordance with a further embodiment, the device for predefining a simulated measuring signal comprises a simulated measuring signal memory containing a simulated measuring value sequence forming the simulated measuring signal. At least one additional simulated measuring signal memory with a further simulated measuring value sequence can be present, and the memories can be selected via the data interface to transmit the simulated measuring signals.

To adapt the measuring signal simulation to the system requirements present at any given moment, the simulated measuring values or the simulated measuring value sequences can be predefined, for instance, by the plant control room and transmitted via the data interface to the memories of the measuring transducer for storage.

BRIEF DESCRIPTION OF THE DRAWINGS

The invention will now be described in greater detail with reference to the drawing figures in which.

DETAILED DESCRIPTION OF THE PREFERRED EMBODIMENTS

Figure 1:
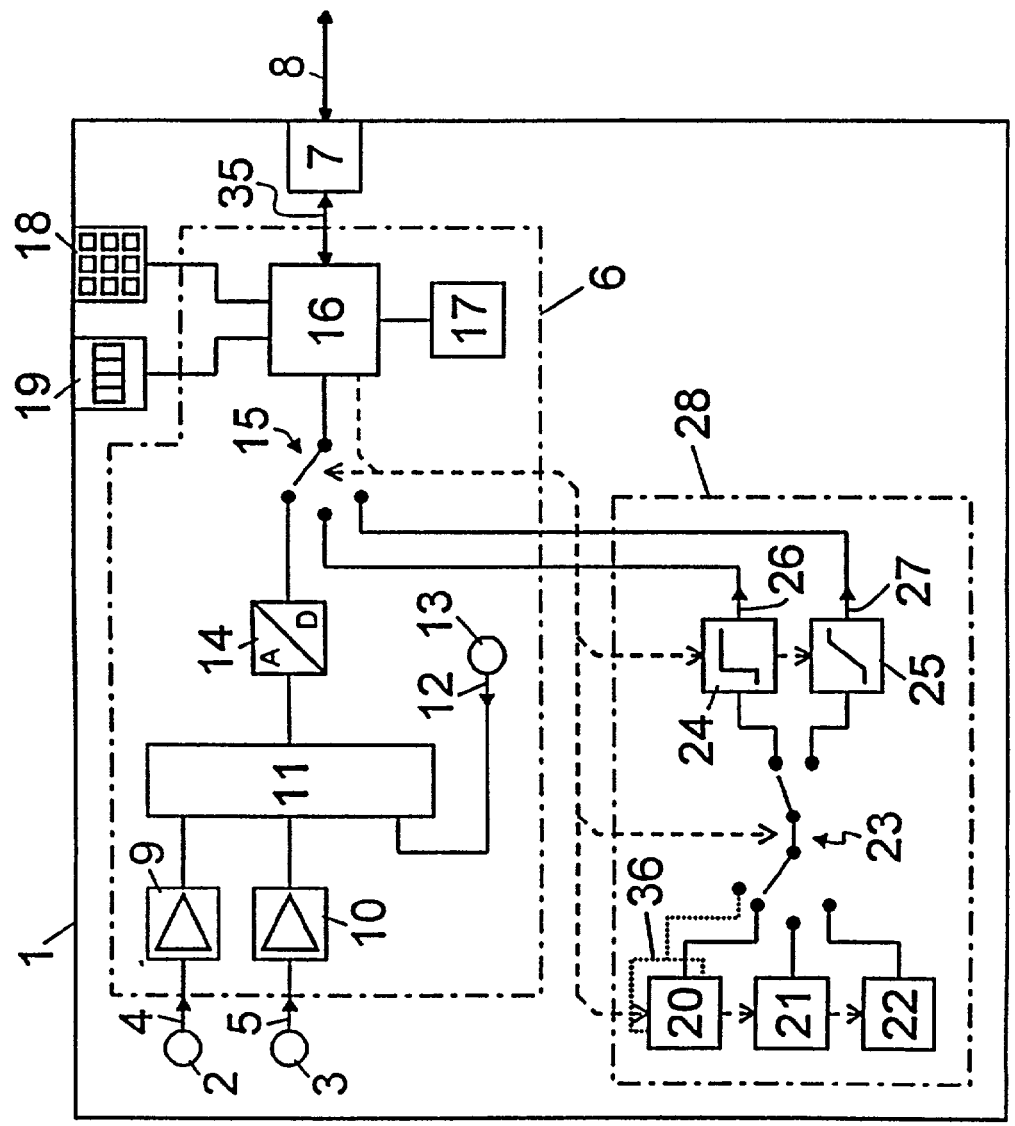
FIG. 1 is a block diagram illustrating a first exemplary embodiment of the measuring transducer according to the invention.

According to one embodiment of the invention, the measuring transducer 1, depicted in FIG. 1, has two sensors, 2 and 3, which are used to detect measured values. For example, sensors 2 and 3 can be a pressure and temperature sensor operable to measure pressure and temperature, respectively, at a measuring point in a technical plant. Further, sensors 2 and 3 can be operable to convert the measured pressure and temperature into electrical sensor signals 4 and 5, respectively. Electrical sensor signals 4 and 5 are processed in a signal processing device 6 which outputs one or more measuring signals 35 that is/are subsequently transmitted via a data interface 7 to the communications system 8 of the technical plant.

In accordance with this embodiment, in the signal processing device 6 the two sensor signals 4 and 5 are supplied to a multiplexer 11 via signal amplifiers 9 and 10, respectively. Multiplexer 11 further receives a sensor signal 12 from, for example, a temperature sensor 13, which forms a component of the signal processing device 6 and records its temperature. Arranged downstream from the multiplexer 11 is an analog-to-digital (A/D) converter 14 for digitizing the sensor signals 4, 5 and 12. The digitized sensor signals 4, 5 and 12, via a controllable switching device 15, are provided to a microcontroller 16 in which, for example, the pressure sensor signal 4 is evaluated and corrected with respect to linearity and temperature behavior.

The temperature behavior, on the other hand, is corrected as a function of the respective temperature detected by sensor 3 at the measuring location in the technical plant and sensor 13 in the signal processing device 6. Furthermore, compensation parameters stored in an EEPROM 17 are used to correct the value from sensor signal 4.

Also, parameterization may be done directly on the measuring transducer 1 via an input unit 18 with associated display unit 19 or, for example, from a control room of the technical plant via communications system 8 and data interface 7.

The pressure sensor signal 4, processed into the pressure measuring signal 35 in microcontroller 16, is finally transmitted via the data interface 7 to the communications system 8 of the plant. The data interface 7 can, for example, be an analog interface drawing 4 to 20 mA employing a simultaneous digital data transmission using the HART protocol or, for example, having a digital PROFIBUS interface. Further, the communications system 8 can be configured as either a two-wire line or a bus.

In order to simulate measured values that are unavailable when the plant is initially started, or while maintenance work is being performed, the measuring transducer 1 comprises a device 28 for predefining simulated measuring signals 26 and 27. Accordingly, for each of the sensors 2, 3 and 13, a simulated measuring value memory 20, 21 and 22, respectively, is provided in which a corresponding simulated digital measuring value (simulated measuring value) is stored for each of the sensors. In accordance with the embodiment shown in FIG. 1, each of the simulated measuring values can be supplied via a controllable distribution device 23 to one of two function generators 24 and 25, which generate the simulated measuring signals 26 and 27 as a function of the respective simulated measuring value. In the example shown, the function generators, 24 and 25 are a step function generator and a ramp function generator, respectively. Examples of other functions that can be generated by function generators 24 and 25 are sinusoidal and asymptotic functions.

Depending on the position of the controllable switching device 15, either sensor signals 4, 5 or 12, in the measuring mode of the measuring transducer 1, or a simulated measuring signal 26 or 27 in a simulation mode of the measuring transducer 1, are supplied to the microcontroller 16. In microcontroller 16, the simulated measuring signals 26 and 27 are further processed in the same manner as the sensor signals 4, 5 and 12. In the measuring mode, measuring signal 35 and in the simulation mode, processed simulated measuring signals 26, 27 are transmitted via the data interface 7 to the communications system 8 of the plant.

The controllable switching device 15 and the distribution device 23 are controlled from the technical plant via the data interface 7 and the microcontroller 16.

Furthermore, the simulated measuring values in the simulated measuring value memories 20, 21 and 22 and the function parameters in the function generators 24 and 25 can be predefined via the input unit 18 or the data interface 7 with the microcontroller 16 connected thereto.

In accordance with a further embodiment of the invention, as shown in FIG. 1, the simulated measuring value memory 20 containing the simulated measuring value for the pressure can include an additional simulated measuring value memory 36 which contains an additional simulated measuring value for the pressure. Also, measuring value memory 36 can be selected via the controllable distribution device 23.

Figure 2:
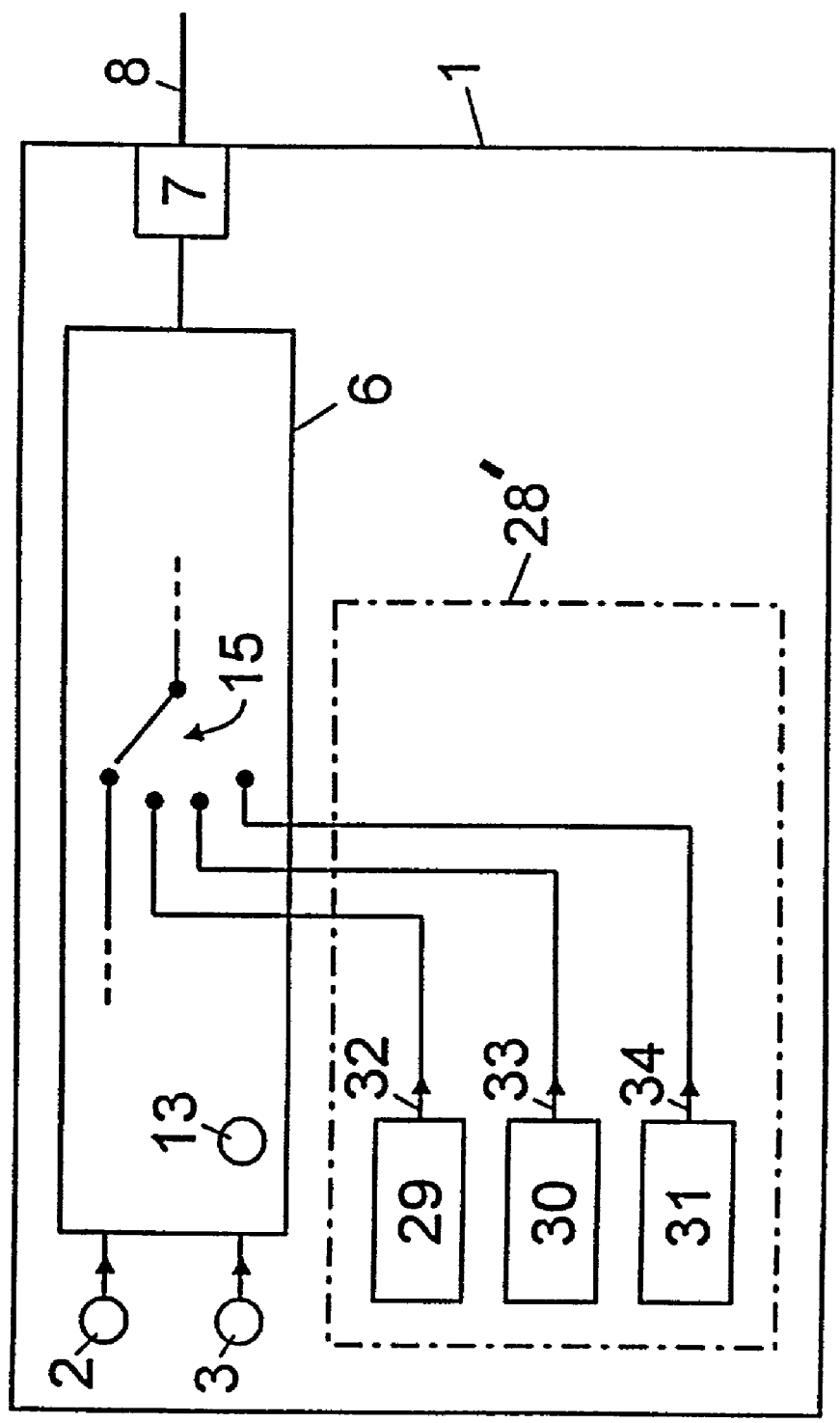
FIG. 2 is a block diagram illustrating a second exemplary embodiment of the measuring transducer according to the invention.

FIG. 2 is a simplified block diagram showing an alternative exemplary embodiment of the measuring transducer 1 depicted in FIG. 1. As illustrated, instead of the simulated measuring value memories 20, 21 and 22 with the downstream function generators 24 and 25, simulated measuring signal memories 29, 30 and 31 are provided within simulator 28'. Simulated measuring signal memories 29, 30 and 31 store simulated measuring signals 32, 33 and 34, respectively, in the form of simulated measuring value sequences, and connect to the controllable switching device 15 such that simulated measuring signals 32, 33 and 34 are provided to data interface 7 and transmitted to communication system 8.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A measuring transducer comprising:
    at least one sensor converting a detected measured value into an electrical sensor signal;
    a signal processor processing the electrical sensor signal and generating a measuring signal;
    a data interface; and
    a simulator generating a simulated measuring signal,
    wherein:
        the simulated measuring signal is a time-dependent function,
        the simulated measuring signal is transmissible upon request via the data interface, and
        the data interface transmits either the measuring signal or the simulated measuring signal to a plant communication system upon receiving a request from the plant communication system, and receives parameterizing signals from the plant communication system for parameterizing the measuring transducer,
    the measuring transducer further comprising: a switch providing either the measuring signal or the simulated measuring signal to the plant communication system via the data interface, the switch being controlled by switch control signals sent from the plant communication system.

2. A measuring transducer comprising:
    at least one sensor converting a detected measured value into an electrical sensor signal;
    a signal processor processing the electrical sensor signal and generating a measuring signal;
    a data interface; and
    a simulator generating a simulated measuring signal,
    wherein:
        the simulated measuring signal is a time-dependent function, and
        wherein the simulated measuring signal is transmissible upon request via the data interface,
    wherein the simulator comprises:
        a simulated measuring value memory operable to store a simulated measuring value;
        a plurality of function generators performing respective time-dependent functions on the simulated measuring value; and
        a function selector selecting one of the function generators.

3. A measuring transducer as claimed in claim 2, wherein:
    the data interface connects the function selector to a plant communication system, and
    the function selector is controlled via function control signals received via the data interface.

4. A measuring transducer comprising:
    at least one sensor converting a detected measured value into an electrical sensor signal;
    a signal processor processing the electrical sensor signal and generating a measuring signal;
    a data interface; and
    a simulator generating a simulated measuring signal,
    wherein:
        the simulated measuring signal is a time-dependent function, and
        the simulated measuring signal is transmissible upon request via the data interface,
    wherein the simulator comprises:
        a plurality of simulated measuring value memories each operable to store a respective simulated measuring value;
        a memory selector selecting one of the simulated measuring value memories;
        at least one function generator performing a time-dependent function on at least one of the simulated measuring values; and
        a function selector connecting the selected simulated measuring value memory to any one of the function generators.

5. A measuring transducer as claimed in claim 4, wherein:
    the data interface connects the function selector to a plant communication system, and
    the function selector receives at least one control signal via the data interface.

* * * * *